(12) United States Patent
Yu et al.

(10) Patent No.: US 6,853,096 B1
(45) Date of Patent: Feb. 8, 2005

(54) WIND TURBINE

(76) Inventors: Young-Sil Yu, 108-1503, Dogok Samsung Remian Apt.Dogok 2-Dong, Kangnam-Ku, Seoul (KR); Byung-Soo Yu, 108-1503, Dogok Samsung Remian Apt.Dogok 2 Dong, Kangnam-Ku, Seoul (KR)

( * ) Notice: Subject to any disclaimer, the term of this patent is extended or adjusted under 35 U.S.C. 154(b) by 0 days.

(21) Appl. No.: 10/714,601
(22) Filed: Nov. 18, 2003
(30) Foreign Application Priority Data Sep. 25, 2003 (KR) .................................. 10-2003-0066573

(51) Int. Cl.⁷ .................................................. F03D 9/00
(52) U.S. Cl. ............................. 290/55; 290/53; 290/54; 290/44; 290/43; 290/52
(58) Field of Search ............................. 290/55, 54, 43, 290/44, 52

(56) References Cited

U.S. PATENT DOCUMENTS 5,760,515 A * 6/1998 Burns .......................... 310/115
6,126,385 A * 10/2000 Lamont ........................ 415/4.5
6,285,090 B1 * 9/2001 Brutsaert et al. .............. 290/55
6,441,507 B1 * 8/2002 Deering et al. ................ 290/44

* cited by examiner

*Primary Examiner*—Nicholas Ponomarenko
*Assistant Examiner*—Iraj A. Mohandesi
(74) *Attorney, Agent, or Firm*—Arent Fox, PLLC

(57) ABSTRACT

A rotation shaft is installed in the center of a wind turbine. Blades are secured to the rotation shaft to be circumferentially spaced apart one from another. Each blade has a lattice composed of transverse lattice elements and longitudinal lattice elements which are plaited to cooperatively define a plurality of spaces. In each space, a rotation adjustment piece is coupled to a first portion of a lattice element to be capable of rotating between a closing position where it closes a predetermined number of the spaces and an opening position where it opens a predetermined number of the spaces, so that the blades as a whole can be rotated irrespective of a wind direction. Electricity is generated using wind applied to the rotation shaft through rotation adjustment pieces.

3 Claims, 2 Drawing Sheets

WIND TURBINE

BACKGROUND OF THE INVENTION

1. Field of the Invention

The present invention relates, in general, to improvements in a wind turbine, and, more particularly, to a wind turbine which is constructed to generate electricity from wind with low velocity from any direction.

2. Description of the Related Art

These days, wind turbines for generating electricity using the wind have been disclosed in the art. The conventional wind turbine comprises a support column which is secured in the ground to have a substantial height, a propeller-shaped rotor which is mounted to an upper end of the support column, and a generator which generates electricity using rotation force of the propeller-shaped rotor.

However, the conventional wind turbine constructed as mentioned above is encountered with a problem in that it occupies a large volume when considering its power generation capacity. Since the rotor, generator and the other parts must be positioned high, installation costs are increased, and it is difficult to conduct repair and maintenance works. Also, the wind turbine may be damaged by exposure to strong wind. Further, in consideration of the structure of the rotor, electricity can be generated only when a wind velocity of at least 5–6 m/sec is maintained. Moreover, because a direction of the rotor should be manually changed in conformity with a wind direction, operational efficiency of the wind turbine is deteriorated in such areas where a light wind blows and the wind direction frequently changes. Furthermore, due to the fact that a center of gravity is placed at a substantial height, it is difficult to install the wind turbine on a ship or an offshore structure. Besides, the support column and the rotor are likely to be damaged by heavy winds.

SUMMARY OF THE INVENTION

Accordingly, the present invention has been made keeping in mind the above problems occurring in the prior art, and an object of the present invention is to provide a wind turbine which is constructed to allow a cylindrical fan to be rotated irrespective of a wind direction and a wind velocity so that electricity can be reliably generated even in such areas where a light wind blows.

In order to achieve the above object, the present invention provides a wind turbine adapted to generate electricity using wind power, comprising: rotation shaft means for transmitting wind power to a generator, and a plurality of blades secured to the rotation shaft means to be spaced apart one from another in a circumferential direction; wherein each blade has a lattice composed of transverse lattice elements and longitudinal lattice elements which are plaited to cooperatively define a plurality of spaces; and wherein, in each blade, each of several rotation adjustment piece made of fabric or rubber is coupled to a portion of a transverse or longitudinal lattice element to be capable of rotating between a closing position where it closes a predetermined number of the spaces and an opening position where it opens a predetermined number of the spaces, so that several rotation adjustment pieces can cover an entire surface of each blade and thereby the blades as a whole can be rotated irrespective of a wind direction; whereby, depending upon a rotated position, the rotation adjustment pieces can open or close the spaces, so that electricity can be generated using wind applied to the rotation shaft means through rotation adjustment pieces.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
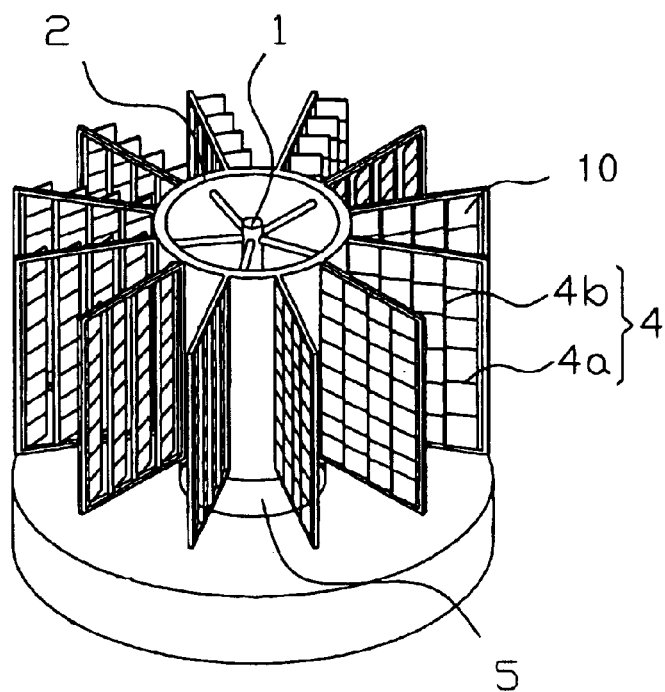
FIG. 1 is a perspective view illustrating a wind turbine in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
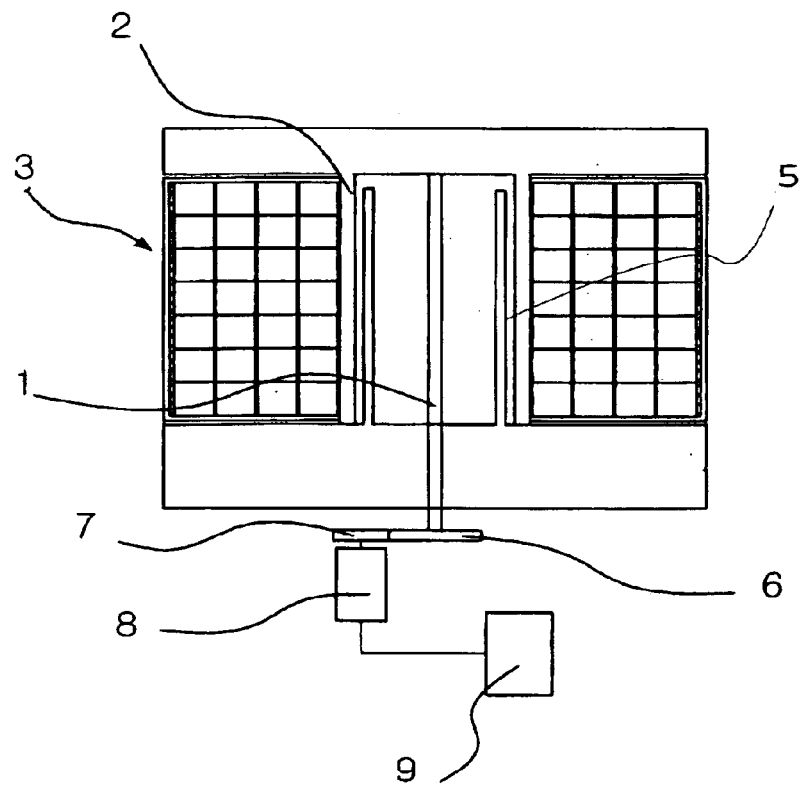
FIG. 2 is a longitudinal cross-sectional view illustrating the wind turbine according to the present invention.
Figure 3:
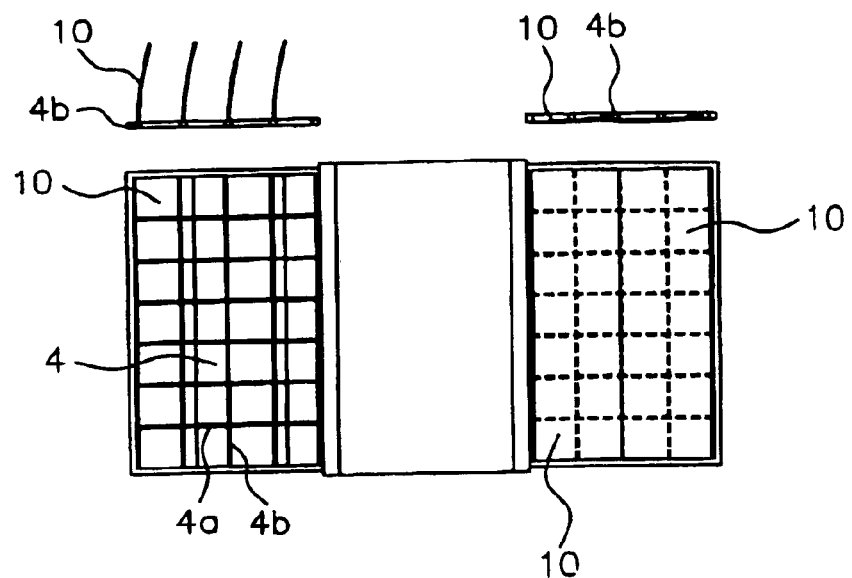
FIG. 3 is a longitudinal cross-sectional view illustrating each blade of the wind turbine attaching several rotation adjustment pieces and an enlarged view of rotation adjustment pieces according to the present invention.

FIG. 1 is a perspective view illustrating a wind turbine in accordance with an embodiment of the present invention; and FIG. 2 is a longitudinal cross-sectional view illustrating the wind turbine according to the present invention; FIG. 3 is a longitudinal cross-sectional view illustrating each blade of the wind turbine attaching several rotation adjustment pieces and an enlarged view of rotation adjustment pieces according to the present invention. A wind turbine in accordance with an embodiment of the present invention includes a rotation shaft 1 which is installed in the center, of the wind turbine, and a rotation cylinder 2 having a plurality of blades 3 is placed around and rigidly connected to the rotation shaft 1. The plurality of blades 3 are secured to the rotation cylinder 2 to be spaced apart one from another in a circumferential direction. Each blade 3 has a lattice 4 composed of transverse lattice elements 4a and longitudinal lattice elements 4b which are plaited to cooperatively define a plurality of spaces. In each of the spaces, a rotation adjustment piece 10 made of fabric or rubber is coupled to a portion of a transverse or longitudinal lattice element 4a and 4b to be capable of rotating between a closing position where it closes a predetermined number of the spaces and an opening position where it opens a predetermined number of the spaces, so that several rotation adjustment pieces can cover an entire surface of each blade and thereby the blades 3 as a whole can be rotated irrespective of a wind direction. Depending upon a rotated position, the rotation adjustment pieces can open or close the spaces, so that electricity can be generated using wind force applied to the rotation shaft 1 through rotation adjustment pieces 10.

A bearing part (structure) 5 is installed inside the rotation cylinder 2 and a fan gear 6 is installed below the rotation shaft 1 in a manner such that the fan gear 6 is meshed with a generator gear 7. By this fact, wind power is transmitted to a generator 8 which generates electricity. Electricity generated by the generator 8 is charged in a charger 9 to then be appropriately supplied to places under need.

Hereafter, operations of the wind turbine according to the present invention, constructed as mentioned above, will be described in detail.

Figure 4:
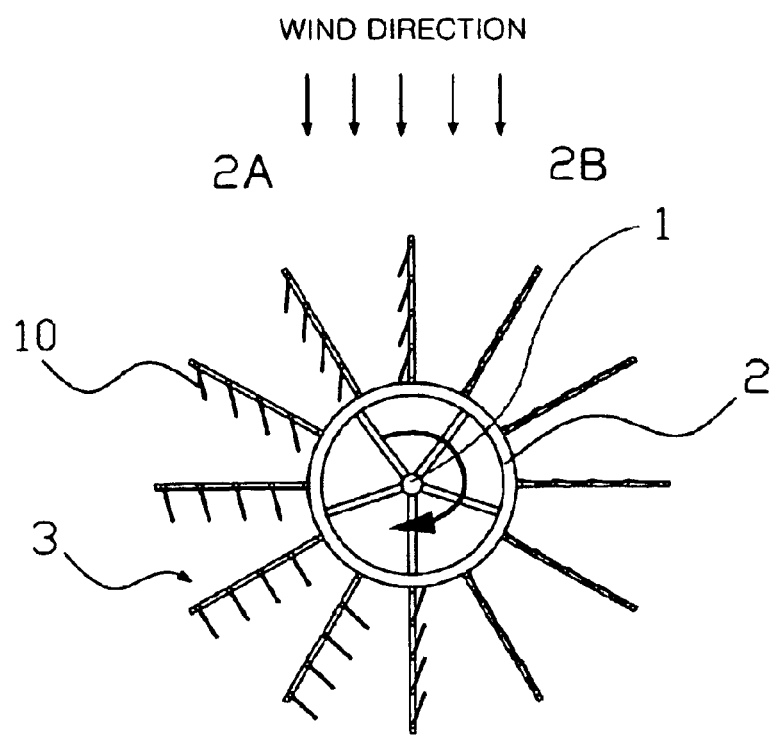
FIG. 4 is a transverse cross-sectional view illustrating blades of the wind turbine according to the present invention.

As shown in FIG. 4, if wind blows from the direction indicated by the arrows, the wind collides with and forces the left blades 2A and right blades 2B. At this time, as described above, each blade 3 has the lattice 4 composed of the transverse lattice elements 4a and the longitudinal lattice elements 4b which are plaited to cooperatively define the plurality of spaces. Also, in each of the spaces, the rotation adjustment piece 10 is coupled to a portion of the transverse or longitudinal lattice element 4a and 4b to be capable of rotating between the closing position where it closes a predetermined number of the spaces and the opening position where it opens a predetermined number of the spaces. Therefore, the rotation adjustment pieces 10 which are installed on the left blades 2A are rotated in a clockwise direction to be opened substantially parallel to the wind direction. On the contrary, the rotation adjustment pieces 10 which are installed on the right blades 2B are rotated in a counterclockwise direction which is opposite to the clockwise direction where the rotation adjustment pieces 10 of the left blades 2A are rotated. As a consequence, when viewing the blades 3 at the position of the rotation shaft 1, since the wind power which is applied to the right blades 2B is larger than the wind power which is applied to the left blades 2A, the rotation shaft 1 is rotated in the clockwise direction. Furthermore, when the heavy wind blows, because the rotation adjustment piece has a flexibility, there is no danger due to a breakaway of the rotation adjustment piece.

While the above description is given on the assumption that wind blows from the left blades 2A toward the right blades 2B, a person skilled in the art will readily recognize that the rotation shaft 1 is rotated in a similar manner even when wind blows from any directions on the blades 3. If the rotation shaft 1 is rotated, since the fan gear and the generator gear 7 disposed below the rotation shaft 1 are meshed with each other, power is transmitted to generate electricity. Electricity generated by the generator 8 is charged in the charger 9 to then be appropriately supplied to places under need. Accordingly, it is possible to generate electricity irrespective of a wind direction.

Preferably, the rotation adjustment pieces 10 are formed in a manner such that each rotation adjustment piece 10 can cover the longitudinal spaces which constitute one longitudinal column in each blade 3. More preferably, the rotation adjustment pieces 10 are formed in a manner such that each rotation adjustment piece 10 can cover the longitudinal spaces which constitute two longitudinal columns in each blade 3. At this time, the rotation adjustment piece 10 is made of a material such as fabric having a predetermined degree of flexibility and synthetic rubber so that there is no danger due to a breakaway of the rotation adjustment piece.

INDUSTRIAL APPLICABILITY

As apparent from the above description, the wind turbine according to the present invention provides advantages in that, since it occupies a small volume and its center of gravity is lowered, installation costs are decreased, repair and maintenance works can be conducted in a simple way, and it is possible to easily manufacture a wind turbine of from small to large sizes. Also, the likelihood of the wind turbine to be broken by a typhoon or a sudden gust of wind is minimized. Moreover, it is possible to generate electricity even in such areas where a light wind blows, irrespective of a wind direction and a wind velocity. In addition, the rotation adjustment piece is made of a material such as fabric having a flexibility and synthetic rubber so that there is no danger due to a breakaway of the rotation adjustment piece.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wind turbine adapted to generate electricity using wind power, comprising:

rotation shaft means for transmitting wind power to a generator, and a plurality of blades secured to the rotation shaft means to be spaced apart one from another in a circumferential direction;

wherein each blade has a lattice composed of transverse lattice elements and longitudinal lattice elements which are plaited to cooperatively define a plurality of spaces; and wherein, in each blade, each of several rotation adjustment pieces is coupled to a portion of a transverse or longitudinal lattice element to be capable of rotating between a closing position where it closes a predetermined number of the spaces and an opening position where it opens a predetermined number of the spaces, so that several rotation adjustment pieces can cover an entire surface of each blade and thereby the blades as a whole can be rotated irrespective of a wind direction;

whereby, depending upon a rotated position, the rotation adjustment pieces can open or close the spaces, so that electricity can be generated using wind force applied to the rotation shaft means through rotation adjustment pieces.

2. The wind turbine as set forth in claim 1, wherein the rotation shaft means comprises a rotation shaft which is installed in the center of the turbine, and a rotation cylinder which is placed around and rigidly connected to the rotation shaft.

3. The wind turbine as set forth in claim 1, wherein the rotation adjustment pieces are made of a material such as fabric having a flexibility and synthetic rubber.

* * * * *